F. CUMONT.
ARRANGEMENT FOR STARTING AND REGULATING DIRECT CURRENT ELECTRIC MOTORS.
APPLICATION FILED APR. 1, 1913.
1,411,419.
Patented Apr. 4, 1922.
3 SHEETS—SHEET 1.
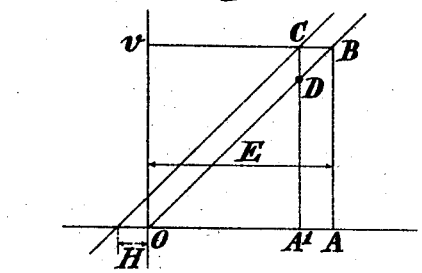
Fig. 1.
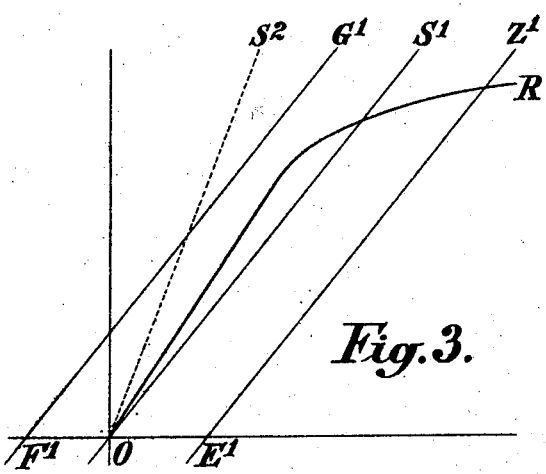
Fig. 2.
Fig. 3.
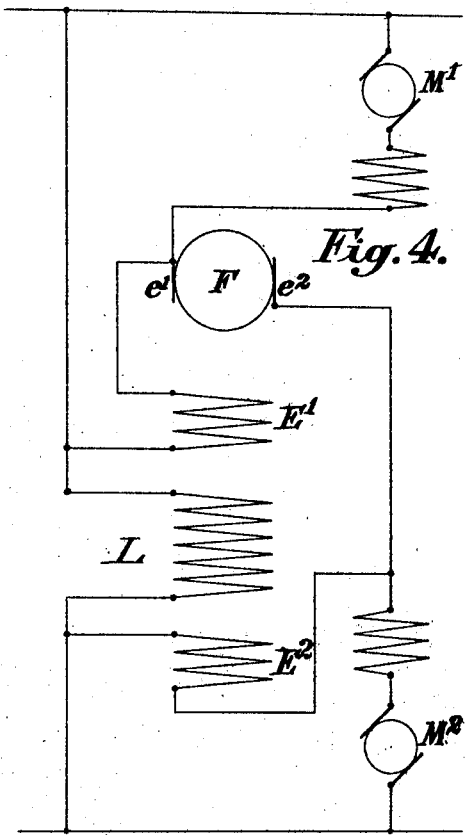
Fig. 4.
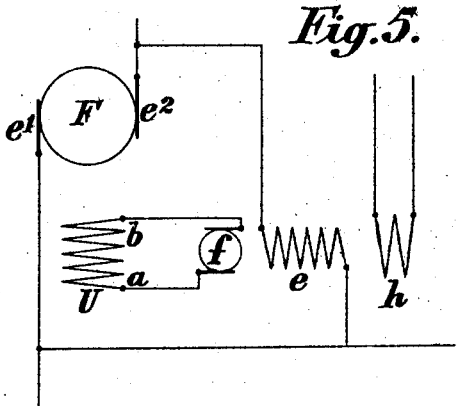
Fig. 5.
Witnesses
L. Compton
M. E. Becker
Inventor
F. Cumont
By Robb & Robb
Attorney

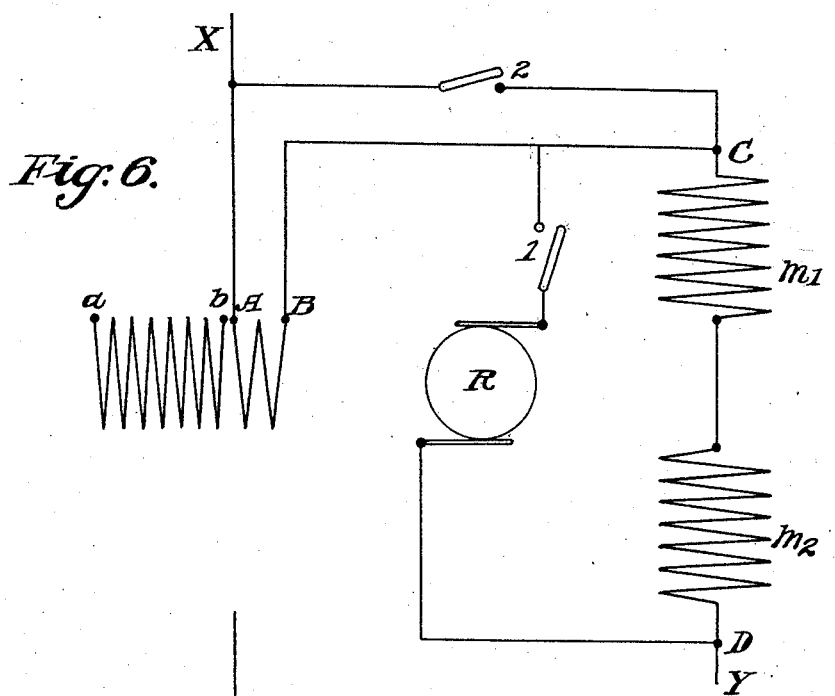
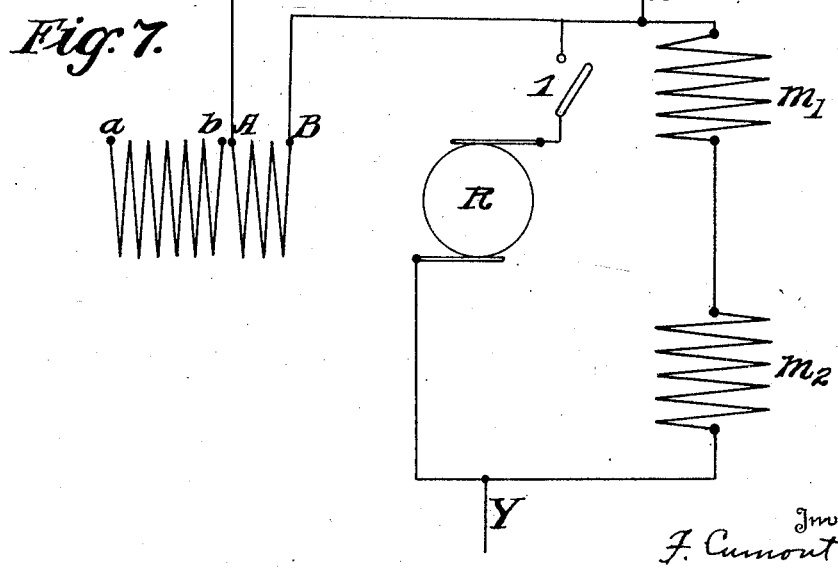

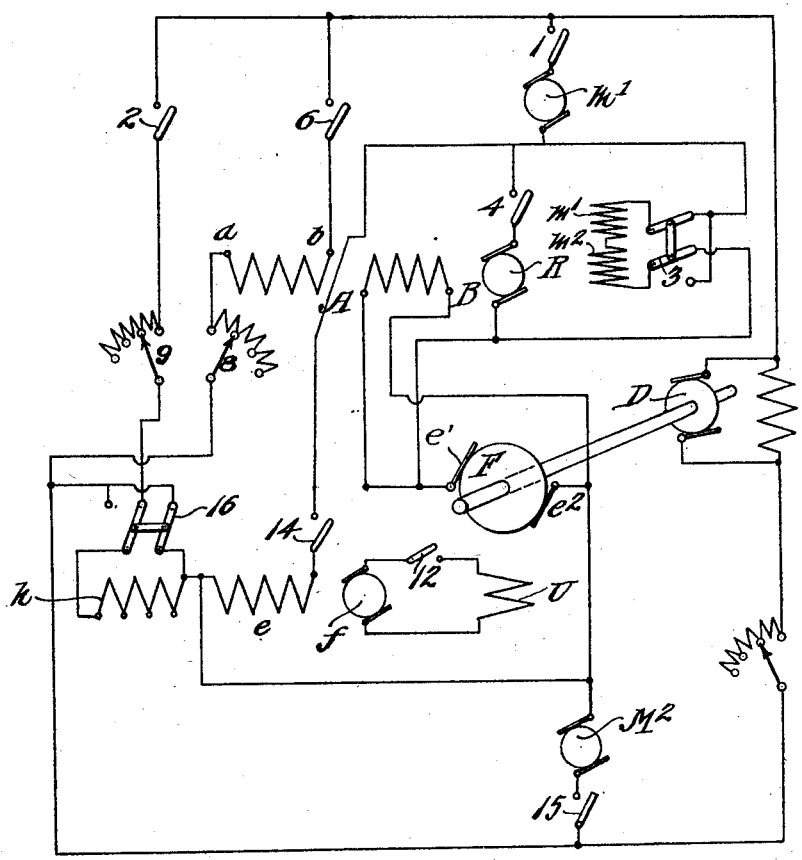

UNITED STATES PATENT OFFICE.

FERNAND CUMONT, OF PARIS, FRANCE, ASSIGNOR TO LA SOCIÉTÉ DITE S. T. A. R. (SYSTEME DE TRACTION AUTO-REGULATEUR), OF PARIS, FRANCE.

ARRANGEMENT FOR STARTING AND REGULATING DIRECT-CURRENT ELECTRIC MOTORS.

1,411,419.    Specification of Letters Patent.    Patented Apr. 4, 1922.

Application filed April 1, 1913. Serial No. 758,212.

(GRANTED UNDER THE PROVISIONS OF THE ACT OF MARCH 3, 1921, 41 STAT. L., 1313.)

*To all whom it may concern:*

Be it known that I, FERNAND CUMONT, a citizen of the Republic of France, residing in Paris, in the Republic of France, have invented certain new and useful Improvements in Arrangements for Starting and Regulating Direct-Current Electric Motors, of which the following is a specification.

The invention relates to improvements in connection with an arrangement for producing in an entirely automatic manner the starting speed regulation and regenerative running of continuous current electric motors, in which a special electric machine takes in or gives out a current of constant strength. This is insured by driving the machine at a constant speed and allowing it to be acted upon by two fluxes, one of which is of constant value, while the other is proportional in value to the voltage across the brushes of the machine. The improvements will be better understood by referring to the drawings herewith in which:—

Figure 1 is a diagram showing the characteristics of the above mentioned machine, Figure 2 is a diagram for a similar machine working in the saturated portion of its characteristic.

Figure 3 is a similar diagram for the case in which the current passing through the machine varies according to a predetermined law.

Figure 4 shows a method of applying the machine to a system of traction motors in series, provided with a special arrangement of winding.

Figure 5 shows the replacement of the windings of the said machine by a single winding excited by a small dynamo.

Figures 6 and 7 show different methods for producing the establishment and the stabilizing of the braking.

Figure 8 shows the application of above improvements to a traction system with means for regulating and controlling same.

Referring to Figure 1 the line O B represents the open circuit characteristic of the machine as well as the characteristic of its shunt winding. If this machine operates or works in the non-saturated portion of its magnetic circuit the current which passes through it is measured by the line C D which corresponds to the fall of voltage in the armature of the machine. If the machine works in the saturated portion of its magnetic circuit (see Figure 2) the characteristic of the shunt winding O S will separate from the open circuit characteristic O R of the machine and in consequence the current will then be measured by the line C' D' which is greater than C D. Under these conditions the current absorbed by the machine will increase with the voltage across its brushes.

In the case in which the machine is functioning as a generator the line representing the resultant characteristic of the excitation windings of the machine hitherto represented by C C' will lie parallel to O S but at an equal distance on the opposite side namely along E Z. Here the current given out by the machine would continue to diminish according as the voltage across the brushes increases.

Because of these properties it is possible, for example, to leave this special machine constantly in circuit during the starting of the traction motors.

In order to make the current absorbed or given out follow a predetermined law it is sufficient that the characteristic of the shunt excitation, for example, O S' (Figure 3) should no longer coincide with the open circuit characteristic O R of the machine.

The lines E' Z' and F' G' which represent the resultant characteristic of the excitation windings of the machine acting as a generator or motor respectively which lie parallel to O S' can be used to determine the value of the current passing through the machine. The line O S' could also be inclined in the direction O S².

Under these conditions the machine is capable of automatically starting and braking the motors with a continuously increasing or decreasing current or at least as long as the machine works in the non-saturated part of its magnetic characteristic. When the saturated part is reached the influence of the machine is identical with that which has been referred to previously, that is to say if it is functioning as a motor the current absorbed increases with the voltage applied to its terminals, whilst if it is functioning as a generator the current sent out by it diminishes. It is obvious that this machine could be used for any case in which these properties are specially useful.

Referring to Figure 4 "e' F e²" represents the regulating machine having windings E', E² and L. These are shown connected with two series traction motors M' and M². In this case the machine F is used for maintaining the current through the traction motors at constant value while working below the limits of saturation. In order that this may be understood it will be noted that the winding E' is placed across the terminals of the traction motor M', the winding E² is placed across the terminals of the traction motor M² and consequently the excitation of these windings depends on the voltage across the motors. The third winding L is placed directly across the mains and may be considered as being compounded of two constant factors, one of which may be designated by the letter K and the other by the letter H which latter is an opposing excitation due to the current passing through the machine so that the total effect of the winding L will be equivalent to the effect of K less the effect of H. Now all these windings have a certain effect on the exciter F and if suitably designed each winding will tend to produce when the machine is working in a non-saturated portion of its characteristic a voltage equal to that which is across the winding in question, thus E' and E² will each tend to produce a voltage in the machine F equal to the voltage across their respective motors. Similarly the winding L will produce an electro-motive force equal to the difference between the effect of K and the effect of H. Now it is evident that the voltage across the mains is equal to the sum of the voltage across the motors plus the voltage across the machine F. Consequently if the effect of K is chosen to be such as if acting by itself it would produce in the machine an electro-motive force equal and opposite to that of the mains, then the effect of the resultant between this part K and the sum of the parts E' and E² would be to produce in the machine F a voltage across its terminals always equal to the voltage applied thereto; while the part H serves for the purpose of balancing the voltage drop in the regulator F. Consequently this arrangement of windings is equivalent to that which would produce the characteristics in Figure 1. C B represents the effect of H which of course would be represented by a line parallel to and removed from the line O B in the direction of A O; O B being the characteristic of the machine F and also the characteristic of the resultant excitation of E', E² and K. Due to this the machine F will maintain the current constant while working below the limits of saturation. The slight modification in the excitations of E' and E² would produce a diagram corresponding to Figure 3, while similarly the machine would work in a saturated portion of its characteristic corresponding to the diagram of Figure 2. The value of the part H will influence the value of the predetermined current.

Naturally the windings E' E² could be replaced by a single winding placed across the terminals of one of the motors and giving a number of turns equal to the sum of the ampere turns of the said windings E' E².

In Figure 5 there is illustrated by way of example a very useful contrivance for exciting the winding of the machine F. This takes the form of a winding preferably of large section, small number of turns and consequently of small self induction excited by a dynamo $f$. This dynamo runs at constant speed and works in a non-saturated portion of its magnetization curve. The effect of armature reaction and resistance can be readily compensated for. This machine is then capable of sending a current through the winding $a$, $b$, which is at all times proportional to the excitation applied to it. This machine will only be of a very small size as the energy, which it has to produce, is very small. Its excitation takes the form of two windings $e$ and $h$. $e$ is directly connected across the terminals of the machine F, and is of such value, that its effect on the system is to produce an electromotive force in machine F, equal to that across its terminals when working in the straight portion of its characteristic, while the winding $h$ is connected to a source of constant current of fixed value. By this means seeing that the machine $f$ is very small the inductance of the winding $e$ will be much less than would be the case if the auxiliary dynamo had not been substituted. The advantage of this is of course that the machine readily responds to changes of voltage in the system. It is therefore very stable.

It may be mentioned that this machine could be advantageously employed in multiple unit traction systems.

In order to increase the stability and to further ensure the constancy of the current the winding $b$ can be replaced by two opposing windings, through one of which passes a constant current, while through the other passes the current traversing the armature of the machine F.

For establishing braking conditions the field windings of the traction motors may be shunted by an ohmic resistance. It will be readily seen that if this resistance be left in circuit during the whole period of braking, it will have a stabilizing effect. In fact, any sudden increase of the current will affect only the ohmic resistance shunting the field coils, without sensibly modifying the current passing through these latter, but it will be understood that this stabilizing effect will be the greater according as the value of the resistance is small relative to that of the field coils of the traction motors. This circumstance would lead to the shunting of an important part of the field current of the motors in order to render the stabilizing means sufficiently effective, and accordingly the resisting torque would be decreased more than is desirable.

In the following discussion the idea just mentioned is further developed, but in a manner which avoids the disadvantage pointed out.

On Figure 6 of the accompanying drawings X Y is the circuit of the traction motors. $m_1$ $m_2$ are field windings of these motors. R is an auxiliary dynamo running at constant speed, being, for instance, driven by the shaft of the regulator. 1 and 2 are switches which permit of the cutting out or putting into circuit of the auxiliary machine R and the winding A B respectively.

During the braking period with which we are now concerned, the switch 1 is closed and the switch 2 is open.

The auxiliary dynamo R may have both excitations A B and $a$ $b$ in action simultaneously, or each one of these may be acting alone, and accordingly three different methods of working are possible. It is first assumed that the independent excitation $a$ $b$ is acting alone. In this case the switch 2 is closed.

This excitation $a$ $b$ is adjusted, for instance, so that when the working conditions of the machine have been established the E. M. F. of the machine R balances the potential difference between the points C D produced by the passage of the current through the field windings $m_1$ $m_2$. This E. M. F. is opposed to the passage of the current through the armature of the machine R, and in the case of sudden variations of current the arrangement behaves practically as if the field windings $m_1$ $m_2$ were actually shunted by the ohmic resistance in this armature, which has very small resistance and practically negligible self-induction.

If the excitation A B acts alone and if this is also adjusted so that when the working conditions of the machine are established the E. M. F. of the auxiliary machine R balances the difference of potential between the points C D, this machine will act in a manner analogous to that previously indicated for sudden variations of current.

It is clear that if the machine R works within the limits where its magnetic circuit is not saturated, the balance established between the E. M. F. of the machine R and the potential difference between the points C D for given conditions will subsist whatever may be the strength of the current.

Within the prescribed limits this arrangement permits of preserving for the motors during braking their series characteristic.

It will now finally be assumed that the two excitations A B and $a$ $b$ act simultaneously.

In this case the ampere-turns of these excitations A B and $a$ $b$ act in opposition, the excitation $a$ $b$ preponderating. They are adjusted so that the difference of their ampere-turns induces for given conditions of working the same E. M. F. in the machine R as under the preceding conditions.

It is seen that in this last case the machine R, in place of serving simply as a buffer for the sudden changes, also acts as a stabilizer for all chance variations of current.

If for some accidental reason the current sent out by the traction motors tends to fall below the value determined for it, the E. M. F. of the dynamo R increases. The current in the field windings $m_1$ $m_2$ also increases, which results in the increase of the current sent out into the line. If the current tends to increase the inverse effect is produced.

In the preceding discussion it has been assumed that the E. M. F. of the machine R balances the voltage between C D, but it will be understood that in place of having exact balance, any desired degree of shunting of the field current could be obtained by adjusting the E. M. F. of the machine R to a suitable value.

Obviously the arrangements above mentioned can be utilized if desired during the starting period.

Another method of excitation of the auxiliary dynamo R is illustrated in Figure 7 of the accompanying drawings. On this drawing X Y is the circuit of the traction motors. $m_1$ $m_2$ are their field windings. R is the auxiliary dynamo. A B and $a$ $b$ are the excitation windings of this auxiliary dynamo. A B is connected to the terminal of the machine F (see Figure 8). The corresponding excitation accordingly has a value which is variable in magnitude and direction. The other winding $a$ $b$ produces an excitation of constant value and may be, for instance, connected to the line. These two windings are arranged so that they act in the same sense for a small motor voltage. I is a switch providing for the cutting out or putting into operation of this auxiliary machine R.

From the point view of stability the result of this arrangement is practically the same as if the field windings of the traction motors were actually shunted by the resistance of the armature of the machine R, since the voltage of this machine R will not materially increase when a sudden increase of the main current takes place.

Further, if the resistance of the armature of the dynamo R be neglected (it is comparatively very small and its action can be counter-acted, for instance, by compound excitation or by a suitable displacement of the brushes) the excitation current of the traction motors is practically independent of the main current and depends solely upon the voltage of the terminals of the machine F that is to say, upon the speed of the motors.

It will be understood that if the speed of the traction motors at which braking is commenced is increased, the voltage at the terminals of these motors at the commencement of the braking period will also increase, although their excitation current diminishes and consequently the excitation current would only become zero for an infinite speed of the motors. On the other hand, it is evident that this excitation current is a maximum when the motors are stopped.

Under these conditions—

1st. Since the excitation of the dynamo R cannot become zero, the voltage at the terminals of the machine F, and consequently that of the traction motors, is limited.

2nd. The excitation of the traction motors being independent of the current, the value of this latter can be separately adjusted by means of the excitation of the machine F, permitting the easy realization of several degrees of braking action.

3rd. The stability of this latter is definitely ensured for sudden variations of the main current are without effect on the voltage of the dynamo R.

Further, if an accidental increase of the voltage of the motors should be produced, it would result in a diminution of the voltage of the auxiliary machine R which would ensure the stabilization of the braking conditions.

It has just been pointed out how the excitation A B of the auxiliary dynamo R permits, by its variations the limitation of the difference of potential at the terminals of the traction motors for increasing speeds at the moment of braking, and that the excitation of the traction motors is a maximum at the stoppage.

Now it may be desired to maintain the excitation current of the traction motors approximately constant below a given speed. For instance, if it is desired to obtain a practically constant braking torque. In order to produce this result it is only necessary to suitably select the magnetization characteristics of the dynamo R, so that for low speeds this dynamo works with a saturated magnetic circuit.

It will readily be seen that the arrangement which has just been described can be utilized not only during braking, but also during the starting period by connecting the excitation windings of the machine R so as to act in a suitable sense.

On the other hand, since the main current through the armatures of the traction motors has no appreciable influence on the strength of the current through the field windings of these motors, the circuits of these windings $m_1$ and $m_2$, and of the dynamo R can be isolated, that is to say, separated from the principal circuit X Y, but then the auxiliary machine R would require to have a greater power.

If in such a case the auxiliary machine R be employed for starting and for braking, it would be possible, by a judicious choice of the characteristics of the machine forming the automatic regulator group including the dynamo R, to maintain for the traction motors their series characteristics, that is to say, to cause their excitation current to be approximately equal to the main current whatever may be the speed. Instead of this, other suitable working characteristics can be given to them.

Further, under the same circumstances, it will be noted that the direction and the magnitude of the current through the armatures of the traction motors are determined by the excitations of the machine F; that the direction and magnitude of the current passing through the field windings of the traction motors are determined by the excitations of the auxiliary machine R. Consequently all the methods of connection and speeds of running which it is desired to realize as well as starting up and braking, can be obtained by acting upon excitation currents of comparatively small values. This remark applies particularly to the method of control with multiple motor units. It permits of the suppressing of several of the control devices, such as contactors or reversing switches, and consequently permits of the production of a much simplified equipment.

A complete system embodying the arrangements described with reference to Figures 5 and 7 is illustrated in Figure 8 as applied to a traction system of two series motors $M_1$ $M_2$. Here we have series motors $M_1$ $M_2$ with their corresponding field windings $m_1$ $m_2$, the regulating machine F with brushes $e_1$ $e_2$ and with winding U driven at constant speed by the shunt wound motor D. Across the field windings $m_1$ $m_2$ is placed the auxiliary dynamo R with its windings A B, $ab$, while across the winding U of the regulator is the small auxiliary dynamo $f$ with its windings $e$ and $h$. Switches are provided numbered 1, 2, 3, 4, 6, 12, 14, 15 and 16 for switching the various parts in and out of circuit. Switch 3 is a change-over switch which can be used both to reverse the field winding of the motors and to switch them in and out of circuit. Regulating resistances 8 and 9 are provided for regulating the constant current through the windings $ab$ of the auxiliary machine R and the winding $h$ of the auxiliary machine $f$. These are shown across the mains although any method of regulation which would give constant current could be adopted, such as cells. Reversing switch 16 is provided for reversing the current in the winding $h$. The exact method of working need hardly be gone into as this has been discussed separately above. The operation of the device will be briefly explained. For normal starting all the switches 1, 2, 4, 6, 15, 12, 14 will be closed. Regulating resistances 8 and 9 are also adjusted as desired and the switches 16 and 3 in the correct position for starting. Current now flows through the motors $M_1$ and $M_2$, their field windings $m_1$, $m_2$, and the armature of the machine F, in series, the current being regulated to a given value determined by the adjustments above mentioned. The winding $e$ is energized due to the difference of potential between the armatures of the motors $M_1$ and $M_2$, while the field winding A—B is energized due to the potential across the terminals $e_1$—$e_2$. As the motors $M_1$—$M_2$ speed up, the increase in their counter electromotive force tends to decrease the effect of the winding $e$ on the dynamo $f$ with a consequent decrease in the field strength of the regulator F and a decrease in its voltage, which in turn reduces the opposition to the flow of current in a proportion to compensate for the increased counter electromotive force due to acceleration of the motors. For reversing the current for braking purposes all that is necessary is to switch over the switches 3 and 16. The motors now act as generators in the well known manner, their output, and consequently the mechanical load or braking effect, being regulated by the opposing effect of the regulator F whose electromotive force is now reversed. The provision of the small auxiliary dynamo and all the low inductance in the circuits of the regulator $f$ insures an almost immediate response of the regulator to rapid changes of current and thus avoids all dangerous currents.

Claims.

1. An electrical system comprising in combination a motor, mains, connections between the terminals of said motor and said mains, a dynamo electric machine, adapted to work in the saturated portion of its characteristic, inserted in said connections, and means for driving said machine at constant speed, and means whereby said machine is acted upon by a flux which is the resultant of two component factors, one of which acting alone would generate a constant electromotive force, and the other acting alone would generate an electromotive force nearly equal and proportional to the voltage across the terminals of said machine when said machine is working in the non-saturated portion of its characteristic.

2. A series-parallel and regenerative system comprising in combination two motors, mains, connections adapted to join one terminal of each motor to the corresponding main, a dynamo electric machine having each of its terminals connected to the other terminals of said motors, and means for driving said machine at constant speed, and means whereby said machine is acted upon by a flux which is the resultant of two component factors, one of which acting alone would generate a constant, E. M. F. and the other acting alone would generate an E. M. F. nearly equal and proportional to the voltage across the terminals of said machine, when said machine is working in the non-saturated portion of its characteristic.

3. An electrical system comprising in combination a motor, mains, connections between the terminals of said motor and said mains, a dynamo electric machine, means to drive said dynamo electric machine at constant speed, an excitation winding connected to a source of constant current and adapted to produce in said dynamo electric machine if acting alone a constant electro-motive force, a second excitation winding connected across part of the motor circuit, the two windings being adapted to produce in said dynamo electric machine an electro-motive force nearly equal and proportional to the electro-motive force across the dynamo electric machine.

4. An electrical system comprising in combination a traction system of series motors, mains, connections between the terminals of said motors and said mains, a dynamo electric machine, means to drive said dynamo electric machine at constant speed, an excitation winding connected to a source of constant current and adapted to produce in said dynamo electric machine if acting alone a constant electro-motive force, a second excitation winding connected across part of the motor circuit, the two windings being adapted to produce in said dynamo electric machine an electro-motive force nearly equal and proportional to the electro-motive force across the dynamo electric machine.

5. An electrical system comprising in combination a motor, mains, connections between the terminals of said motor and said mains, a dynamo electric machine, means to drive said machine at constant speed, an auxiliary dynamo electric machine working in the non-saturated portion of its characteristic, means to produce a flux in said machine which is the component of two auxiliary fluxes, one of which is constant and the other proportional to the voltage across the terminals of said first mentioned machine, and connections between the terminals of said auxiliary machine and the field winding of said first named machine.

6. An electrical system comprising in combination a motor, mains, connections between the terminals of said motor and said mains, a dynamo electric machine, means to drive said machine at constant speed, an auxiliary dynamo electric machine working in the non saturated portion of its characteristic, means to produce a flux in said auxiliary machine which is the component of two fluxes, one of which is constant and the other proportional to, and of such value as to produce in said first named machine an E. M. F. nearly equal to the voltage across the terminals of said auxiliary machine, and connections between the terminals of said auxiliary machine and the field winding of said first named machine.

7. An electrical system comprising in combination a motor, mains, connections between the terminals of said motor and said mains, a dynamo electric machine, a field winding on said dynamo electric machine having few turns and small self induction, means to drive said machine at constant speed, an auxiliary dynamo electric machine working in the non saturated portion of its characteristic, means to produce a flux in said auxiliary machine which is the component of two fluxes, one of which is constant and the other proportional to the voltage across the terminals of said machine, and connections between the terminals of said auxiliary machine and the field winding of said first named machine.

8. An electrical system comprising in combination a motor, mains, connections between the terminals of said motor and said mains, rotary apparatus for supplying constant current and an auxiliary dynamo connected across the field winding of said motor generating an E. M. F. equal to the normal voltage across said winding.

9. An electrical system comprising in combination a traction system of series motors, mains, connections between the terminals of said motors and said mains, rotary apparatus for supplying constant current, and an auxiliary dynamo connected across the field winding of said motors generating an E. M. F. equal to the normal voltage across said winding.

10. An electrical system comprising in combination a motor, mains, connections between the terminals of said motor and said mains, rotary apparatus for supplying constant current, and an auxiliary dynamo connected across the field winding of said motor, said auxiliary dynamo having an excitation the value of which varies with the voltage of said rotary apparatus.

11. An electrical system comprising in combination a motor, mains, connections between the terminals of said motor and said mains, rotary apparatus for supplying constant current, and an auxiliary dynamo connected across the field winding of said motor, said auxiliary dynamo having an excitation which is the component of two excitations, one of which is constant and the other proportional to the voltage across said rotary apparatus.

12. An electrical system comprising in combination a motor, a field winding on said motor, mains, connections between the terminals of said motor and said mains, rotary apparatus for supplying constant current, and an auxiliary dynamo connected across the motor field winding and having an excitation proportional to the voltage across said rotary apparatus.

13. An electrical system comprising in combination a traction system of series motors, mains, connections between the terminals of said motors and said mains, rotary apparatus for supplying constant current, and an auxiliary dynamo connected across the field winding of said motor, said auxiliary dynamo having an excitation, the value of which varies with the voltage across said rotary apparatus.

14. An electrical system comprising in combination a traction system of series motors, mains, connections between the terminals of said motor and said mains, rotary apparatus for supplying constant current, and an auxiliary dynamo connected across the field winding of said motor, said auxiliary dynamo having an excitation which is the component of two excitations, one of which is constant and the other proportional to the voltage across said rotary apparatus.

15. An electrical system comprising in combination a traction system of series motors, mains, connections between the terminals of said motor and said mains, rotary apparatus for supplying constant current, and an auxiliary dynamo connected across the field winding of said motor, and having an excitation proportional to the current through said motor.

16. An electrical system comprising in combination a motor, mains, connections between the terminals of said motor and said mains, a dynamo electric machine, means to drive said machine at constant speed, an auxiliary dynamo electric machine, and means whereby said machine is acted upon by two fluxes, one of which is constant and the other proportional to the voltage across the terminals of said first named machine, connections between the terminals of said auxiliary machine and the field winding of said first named machine, the said auxiliary machine working in the non-saturated portion of its characteristic, an auxiliary dynamo across the field winding of said motor generating an E. M. F. equal to the normal voltage across said winding.

17. A series-parallel and regenerative system comprising in combination two motors, mains, connections adapted to join one terminal of each motor to the corresponding main, a dynamo electric machine, the terminals of said machine being connected to the other terminals of said motors, exciting windings adapted to produce electromotive forces in said dynamo electric machine, and means for supplying one of which with constant current, and the other with current proportional to the E. M. F. across part of the motor circuit.

18. An electrical system comprising in combination a motor, mains, connections between the terminals of said motor and said mains, rotary apparatus comprising means for generating two electromotive forces, one of constant value and the other nearly equal and proportional to the voltage across the terminals of said rotary apparatus, and an auxiliary dynamo across the field winding of said motor, generating an E. M. F. equal to the normal E. M. F. across the field winding.

19. An electrical system comprising in combination a traction system of series motors, mains, connections between the terminals of said motor and said mains, rotary apparatus comprising means for generating two E. M. F.'s one of constant value and the other nearly equal and proportional to the voltage across the terminals of said rotary apparatus, and an auxiliary dynamo across the field winding of said motor, generating an E. M. F. equal to the normal E. M. F. across the field winding.

20. An electrical system comprising in combination a traction system of series motors, mains, connections between the terminals of said motors and said mains, rotary apparatus comprising means for generating two E. M. F.'s, one of constant value and the other nearly equal and proportional to the voltage across the terminals of said rotary apparatus, an auxiliary dynamo across the field winding of said motors generating an E. M. F. equal to the normal E. M. F. across the field winding, two field windings on said dynamo electric machine, one having constant current through it and the other proportional to the voltage across the terminals of said rotary apparatus 21. An electrical system comprising in combination a motor, mains, connections between the terminals of said motor and said mains, a dynamo electric machine, means to drive said machine at constant speed, an auxiliary dynamo electric machine working in a non-saturated portion of its characteristic, an excitation winding connected to a source of constant current and adapted to produce in said dynamo electric machine if acting alone a constant electromotive force, a second excitation winding connected across part of the motor circuit, the two windings being adapted to produce in said dynamo electric machine an electromotive force nearly equal and proportional to the electromotive force across the dynamo electric machine.

In witness whereof, I have hereunto signed my name this 21st day of March 1913, in the presence of two subscribing witnesses.

FERNAND CUMONT.

Witnesses:
 BARTLEY F. YOST,
 ALPHONSE MEJEAN.